Aug. 4, 1959   H. A. MICHLIN   2,898,495
COLOR DISPLAY PHOSPHOR SCREENS
Filed June 24, 1958

United States Patent Office 2,898,495
Patented Aug. 4, 1959

2,898,495

COLOR DISPLAY PHOSPHOR SCREENS

Hyman A. Michlin, New York, N.Y.

Application June 24, 1958, Serial No. 744,258

17 Claims. (Cl. 313—92)

This invention relates to resultant color phosphor screens formed with component color emitting phosphors in separate elemental areas; and in particular to method and means for causing the spaces between elemental areas of component color emitting phosphors to control the color emission in the spaces therebetween.

At the present state of the art color images are formed in component color dots or lines in phosphor screens having spaces therebetween which prevent the full use of the phosphor screen space. In display signs for advertising, color and a clear image plays an important part in attracting attention; and an increase in color saturation and the effecting of clearer outlines of color images using color dot or line phosphor screens would be more pleasing and attracting.

One object of this invention is to provide a method and means for producing clearer color images.

Another object of the invention is to provide a method and means for selectively effecting color enhancement.

Another object of this invention is to provide a method and means which can be adapted to television by one skilled in the art.

Another object of the invention is to provide a half-tone color phosphor screen capable of emitting color in greater area.

Another object of the invention is to provide a method and means for causing spaces between component color emitting areas to emit in a desired resultant color to enhance the resultant color image.

Another object of the invention is to provide a color phosphor screen capable of emitting more color than heretofore.

Another object of the invention is to provide a method and means for producing greater emission of color by luminescence effected electrically and luminescence effected by photons.

Another object of the invention is to provide a method and means for effecting a color image outline from a plurality of small excitation energy sources.

Figure 1:
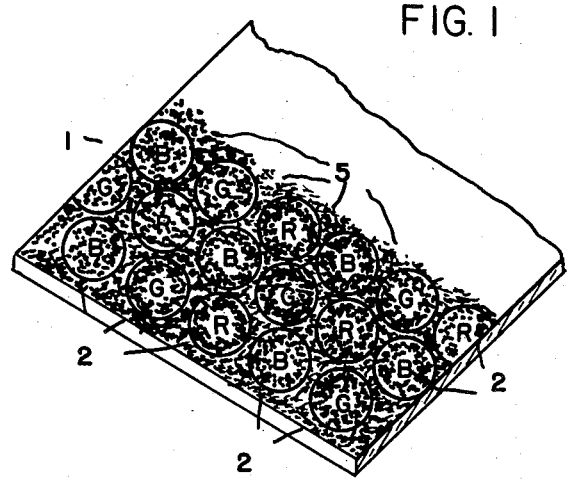
Figure 2:
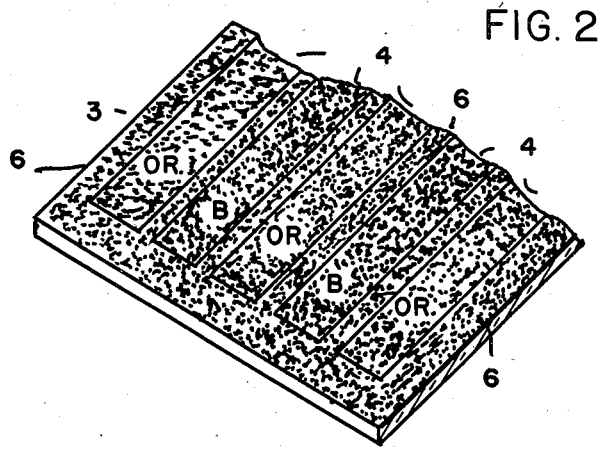
Figure 3:
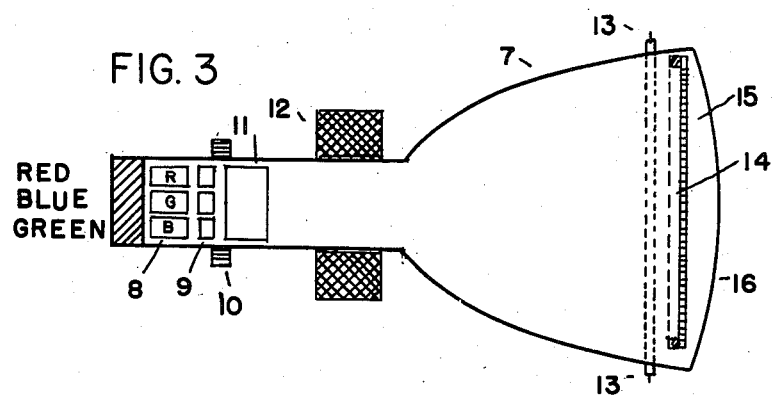

These and other objects of the present invention will become apparent from the following description of specific embodiments when read in connection with the accompanying drawings and claims, in which one embodiment of the invention is schematically illustrated in Figure 1; another embodiment is schematically illustrated in Figure 2; and a tri-color kinescope, using the phosphor screen of Figure 2, is schematically illustrated in Figure 3.

Referring to Figure 1 to illustrate, by way of example, a mode of the invention. Figure 1 schematically illustrates glass base 1 and the component color emitting phosphor dots 2 thereon, which can be conventional color cathodoluminescent phosphor dot screens having therein clear spaces 5 between the phosphor dots 2. The phosphor dots designated by the letter G are green emitting; those designated by the letter R are red emitting; and those designated by the letter B are blue emitting.

In one mode of the invention, by way of example, each of the phosphor dots have therein excitation energy phosphors emitting in 3700 Angstroms, for example $$Cd_2MgSi_2:Ce$$

The spaces 5 are filled with phosphors sensitive to photoluminesce in white light on being excited with the excitation energy of 3700 Angstroms. Patent No. 2,452,522 describes such phosphors which can be combined to form white light, for example, a suitable mixture of the phosphors represented in Figures 2, 3 and 4 thereof. So that on selectively exciting the phosphor dots in the conventional manner there is produced a resultant color image, and the excitation energy phosphors in each of the phosphor dots 2 emits excitation energy in accordance with electrons impacted thereon. The emitted excitation energy irradiates the photoluminescent phosphors in the spaces 5 between of the phosphor dots of each triad of phosphor dots to thereby produce an intensity of white light emission therefrom depending on the combined intensities of the excitation energies irradiated thereon from each triad of phosphor dots, thereby producing an image in white light. On mixing black pigment in the phosphors in spaces in a way as to effect emission of white light through the pigment in the manner of transparent paint, an image in black would be produced. This is by way of example as other colorants, pigments and dyes for example, may be used. The above is not intended to be restrictive as visible light may be used as excitation energy.

In another mode of the invention, by way of example, the spaces 5 between the phosphor dots 2 can have a layer of finely cut glass particles capable of reflecting and refracting the component color rays emitted from the G, R and B phosphor dots 2 so as to combine and change the direction of the component color rays to produce a resultant color tint in each of the spaces between each of the triads of phosphor dots 2 to thereby produce, between each triad of phosphor dots, the same resultant color as is formed by each triad of phosphor dots thereby producing a tinted color image to key the resultant color image produced by the triads of phosphor dots 2. On mixing a black pigment in the spaces 5 with the cut glass in a way so as to permit the transmission of light rays, there would be produced an image in black. This is by way of example as other colorants, pigments or dyes, can be used.

The above examples of modes of invention are not intended to be restrictive as the phosphor dots 2 may be electroluminescent.

Referring to Fig. 3 to illustrate a method for forming the component color image in the component color emitting phopshor elemental areas, and, the resultant color or one color image in the spaces between the component color phosphor elemental areas as noted in the above description of Figure 1. Figure 3 schematically illustrates conventional three gun tri-color kinescope having envelope 7, three electron guns 8, one for each color, focussing electrode 9, purifying coil 10, converging electrode 11, deflecting yoke 12, ultor anode 13, shadow mask 14, the phosphor plate 15 which can be the phosphor plate schematically illustrated in Figure 1, and glass face plate 16. The red, blue and green video signals are applied to their respective color guns so as to impact a triad of three phosphor component color emitting elemental areas to cause component colors to be emitted therefrom in accordance with the video color signal.

Where refracting or reflecting substances, as explained above, are in the spaces 5, then the emitted component color rays from the phosphor elemental areas irradiate the space therebetween to be thereby combined as to form a resultant color. As the appropriate electron beams are caused to impact each of the three phosphor component color emitting elemental areas 2 in a triad of phosphor dots, a succession of resultant colors in each of the spaces 5 will be produced thereby producing a resultant color image therein representative of the color video signal.

Where phosphors, as explained above, are in the spaces 5, and luminescent excitation radiant energy phosphors are in the elemental areas of component color emitting phosphors 2; then the emitted luminescent excitation radiant energies will irradiate the space 5 between a triad of phosphor elemental areas 2 so as to effect therein a luminescence in an intensity in accordance with the combined luminescent excitation radiant energies irradiated thereon. As the electron beams are caused to impact each triad of three phosphor component color emitting elemental areas 2, a succession of different intensities of luminescence, in accordance with the intensities of the electron beams impacting each triad of component color emitting phosphors in elemental areas 2, will be produced in the spaces 5 thereby producing a color image therein representative of the resultant color image produced in the triads of phosphor dots.

Referring to Figure 2 to illustrate, by way of example, another mode of the invention. Figure 2 schematically illustrates a glass base 3, component color emitting phosphor lines 4 which can be conventional color cathodoluminescent phosphors, and clear spaces 6 between the phosphor lines 4. The phosphor lines 4 designated by the letters OR are orange-red emitting; and the phosphor lines 4 designated by the letter B are blue emitting.

In this example of the invention, excitation energy phosphors emitting at 3700 Angstroms, for example $Cd_2MgSi_2$:Ce, are mixed with the phosphors in the blue lines of phosphors. Excitation energy phosphors emitting at 3200 Angstroms, for example, pure aluminum oxide, are mixed with the phosphors in the orange-red lines of phosphors. Zirconium pyrophosphate peak emits at 2900 Angstroms under electron bombardment.

The phosphors in the spaces comprise a mixture of zinc sulphide activated with silver and sensitive to peak photoluminescence in blue when excited with excitation energy in the low part of the ultra-violet spectrum at 3200 Angstroms; and, of calcium and cadmium molybdate activated with lead and samarium and sensitive to photoluminesce in the orange-red when excited with execitation energy in the upper part of the ultra-violet spectrum at 3700 Angstroms, whereby on selectively activating elemental areas of each of the lines of phosphors 6 to luminesce in a line-screen color kinescope, there would be produced a resultant color image in the lines of phosphors 4, and, an image in excitation energies irradiated on the phosphors in the spaces 6, thereby producing a like resultant color image in the spaces 6.

It is obvious that the excitation energies emitted from elemental areas of the phosphor lines 4 would peak irradiate the elemental areas of spaces adjacent thereto and therebetween, whereby the 3700 excitation energy would cause the orange-red emitting phosphors in the spaces 6 to luminesce; and the 3200 excitation energy would cause the blue emitting photoluminescent phosphors in the spaces to luminesce, thereby producing a resultant color luminescent image in said spaces 6. One example of the line-color kinescope is disclosed in the RCA Review, vol. XII, No. 3, page 546.

Each of the excitation energy phosphors need not be peak emitting in a narrow bandwidth as the essence of the principle of the invention is that there be a different intensity of excitation energy emission from each excitation energy emitting phosphor in different parts of the light spectrum. So that one excitation energy phosphor will excite a greater light emission from some phosphors and less from other phosphors; and the other excitation energy phosphor will excite a greater light emission from said other phosphors and less from said same phosphors.

A reflecting layer, such as aluminum, can be placed as a backing over the phosphor dots 2 or line 4, and, also over the substances in the spaces 5 and 6.

The use of a key color image in the spaces in connection with three component color resultant color image will achieve four color reproducing with the key color image representing the whole of the tones of the image outline. Other advantages resulting from such four color half-tone reproduction are well known.

While I have described above the principles of my invention in connection with specific embodiments, it is to be clearly understood that this description is made only by way of example and not as a limitation on the scope of my invention.

I claim:

1. A half-tone color phosphor screen comprising elemental areas of different color light ray emitting phosphors with spaces between said elemental areas of phosphors, the spaces having therein substances capable of changing the direction of the light rays emitted from adjacent light ray emitting areas, said light rays from said emitting phosphors and said light rays which have been changed in direction produce a combined color image.

2. A half-tone color phosphor screen comprising component color elemental areas and spaces therebetween, each of said elemental areas having a component color and excitation energy emitting phosphor therein, said spaces having photoluminescent substances therein responsive to excitation by the emitted excitation energy from the adjacent phosphor component color elemental areas.

3. Means for producing an improved luminescent color image comprising a half-tone color phosphor screen having spaces between different light ray emitting phosphor elemental areas, said spaces filled with colorant arranged to change the direction of light rays emitted from adjacent different light ray emitting phosphor elemental areas; an electron image emitting source capable of forming and projecting an electron image on the different light ray emitting phosphor elemental areas for producing a color image and another color image formed in said spaces by said color image, both of said color images producing a half-tone color image.

4. The means for producing an improved color image comprising the color phosphor screen of claim 2; and means to excite the phosphors of the elemental areas to emit a first color image which excites the photoluminescent substances in a light energy image whereby the excitation energy forms another color image in the spaces, both of said color images producing a combined color image in interwoven relation.

5. The apparatus for producing an improved color image comprising a half-tone color phosphor screen of elemental areas of phosphors and substances in spaces therebetween, said phosphors emitting in different light rays, said spaces having substances capable of changing the direction of the light rays emitted to the spaces from adjacent phosphors; and means for exciting the phosphors to emit different light rays which forms a first color image therein and simultaneously forming another color image in said spaces in a combined interwoven relation with said first image.

6. The half-tone color phosphor screen of claim 2 in which each of the component color light ray emitting phosphor elemental areas also has therein a phosphor emitting in a different luminescent excitation radiant energy, and, the substances in each of the spaces are a mixture of a plurality of different kinds of substances, each kind responsive to a different luminescent excitation radiant energy to luminesce in a visible color.

7. The half-tone color phosphor screen of claim 2 in which each of the component color emitting phosphor elemental areas has therein a phosphor emitting in a same luminescent excitation radiant energy, and the substances in the spaces are phosphors responsive to the said same luminescent excitation radiant energy to effect a luminesence of at least one color.

8. The half-tone color phosphor screen of claim 1 in which the substances in the spaces are optical elements.

9. The color phosphor screen of claim 6 in which the spaces also contain colorant.

10. The color phosphor screen of claim 7 in which the spaces also contain colorant.

11. The color phosphor screen of claim 2 in which the spaces also contain colorant.

12. The color phosphor screen of claim 8 in which the spaces also contain colorant.

13. Means for producing an improved luminescent color image comprising a half-tone color phosphor screen having spaces between different light ray emitting phosphor elemental areas, said spaces filled with substances capable of changing the direction of light rays emitted from adjacent component color phosphor elemental areas; an electron emitting source capable of forming and projecting an electron image on said phosphor elemental areas thereby producing a color image which produces another color image in the spaces, both of said color images forming a half-tone color image.

14. The means of claim 13 in which the substances capable of changing the direction of light rays are photoluminescent.

15. The means of claim 13 in which the substances capable of changing the direction of light rays are optical elements.

16. The means for producing an improved color image comprising means for exciting the separate component color elements of a half-tone color screen having spaces therein to form a first color image; and means for forming another color image in said spaces, said another color image representative of the first color image; both color images in interwoven relation to effect a combined color image.

17. A color phosphor screen comprising different color light ray emitting phosphor areas with spaces between said phosphor areas, the spaces having therein colorant arranged to change the direction of light rays emitted from adjacent different color light ray emitting phosphor areas.

References Cited in the file of this patent

UNITED STATES PATENTS

| | | |
|---|---|---|
| 2,289,978 | Malter | July 14, 1942 |
| 2,599,739 | Barnes | June 10, 1952 |
| 2,706,262 | Barnes | Apr. 12, 1955 |